United States Patent [19]

Freund, Jr. et al.

[11] 4,287,773

[45] Sep. 8, 1981

[54] BIDIRECTIONAL MAGNETIC FLOWMETER

[75] Inventors: William R. Freund, Jr., Hatfield; John C. Grebe, Jr., Norristown, both of Pa.

[73] Assignee: Emerson Electric Co., St. Louis, Mo.

[21] Appl. No.: 82,764

[22] Filed: Oct. 9, 1979

[51] Int. Cl.³ .............................................. G01F 1/60
[52] U.S. Cl. ................................................ 73/861.12
[58] Field of Search ............ 73/861.12, 861.16, 861.17

[56] References Cited

U.S. PATENT DOCUMENTS 4,089,219  5/1978  Suzuki .............................. 73/861.16

Primary Examiner—Charles A. Ruehl
Attorney, Agent, or Firm—Polster, Polster and Lucchesi

[57] ABSTRACT

A magnetic flowmeter includes means for sensing the polarity of its output signal and automatically reversing its electrode leads in response to a change in polarity.

5 Claims, 1 Drawing Figure

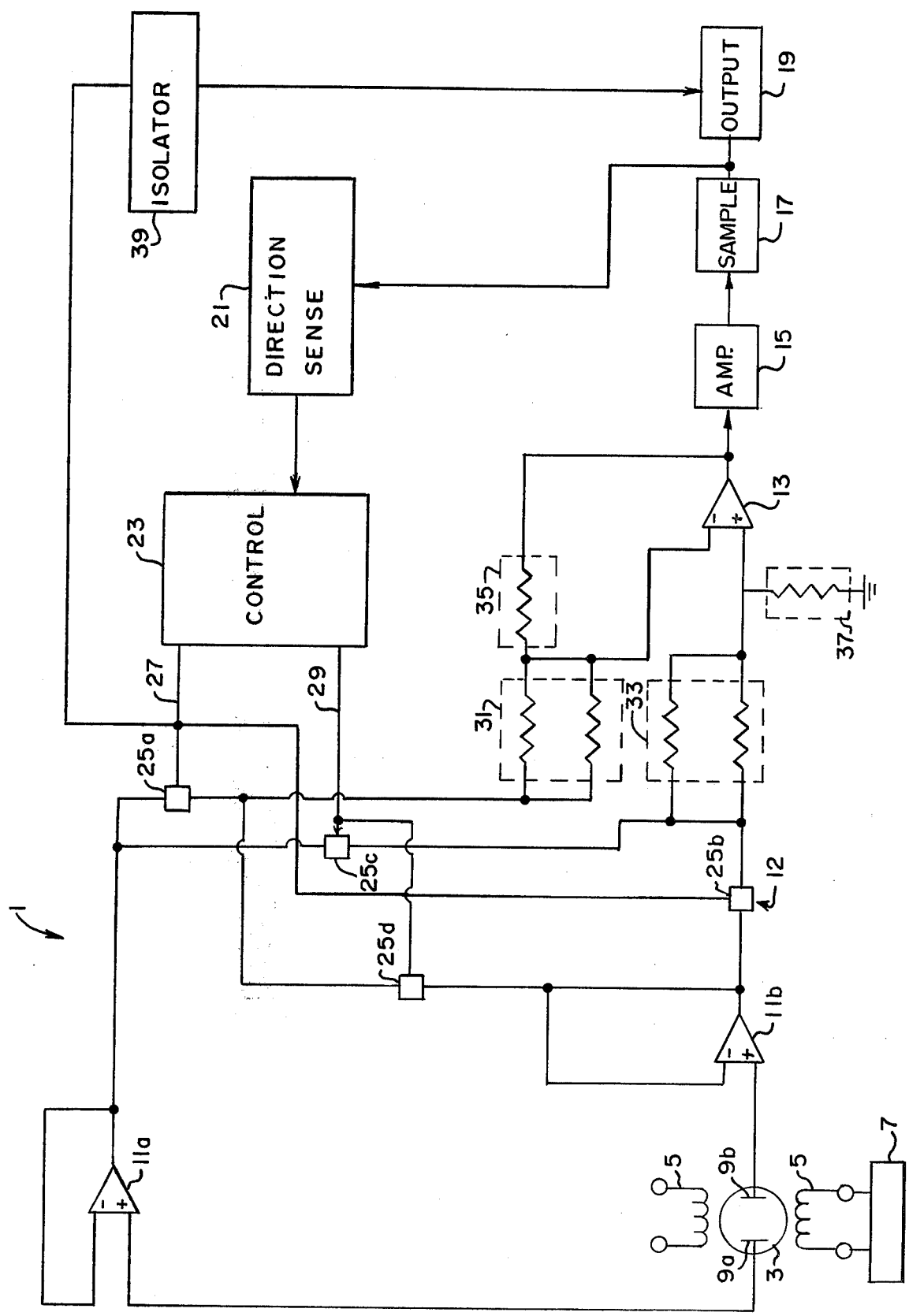

BIDIRECTIONAL MAGNETIC FLOWMETER

BACKGROUND OF THE INVENTION

This invention relates to electromagnetic flowmeters and in particular to such meters in which the flow of fluid through the meter may be in either of two opposite directions.

In an electromagnetic flowmeter a magnetic field across a flow tube generates a voltage in a fluid flowing through the tube. The voltage, which is proportional to flow rate, is sensed by a pair of electrodes in contact with the fluid, and is amplified by a differential amplifier to produce a flow-dependent signal which is amplified by a signal processing system to produce an output signal which is proportional to flow rate. When the flow is reversed in the flow tube, the voltage, hence the flow-dependent signal, is also reversed. If the signal processing system has the capability to handle signals of both positive and negative polarity, as does a microprocessor-based system which produces positive or negative "words" indicative of both the polarity and magnitude of an input signal, the output signal is indicative of both flow rate and direction without further signal processing. Unfortunately, most commonly used magnetic flowmeter signal processing systems do not easily and accurately handle signals of both positive and negative polarity. It has therefore recently been proposed to add to a conventional magnetic flowmeter signal processing system a "negative one" amplifier, which when switched into the system inverts the polarity of the flow-dependent signal. This system, described in U.S. Pat. No. 4,089,219 to Suzuki, adds a component (the negative one amplifier) to the signal processing chain during reverse flow conditions. It therefore requires that the negative one amplifier invert the signal accurately and without any offset error. These requirements are difficult to achieve, and generally require an additional adjustment to ensure accurate calibration of the reverse flow measuring system.

SUMMARY OF THE INVENTION

One of the objects of this invention is to provide a magnetic flowmeter in which the signal processing chain is symmetrical for each direction of flow of fluid in the flow tube.

Another object is to provide such a flowmeter in which no additional calibration is necessary for calibrating the system for "reverse" flow.

Other objects will occur to those skilled in the art in light of the following description and accompanying drawing.

In accordance with this invention, generally stated, a magnetic flowmeter is provided comprising a body adapted to be connected in a flow system for measuring the flow of a fluid therethrough, means for generating a magnetic field in the fluid flowing through the body, a pair of electrodes for producing a voltage dependent on the electric field generated in the flulid flowing through the magnetic field, and signal processing means for converting the output voltage to an output signal, the signal processing means comprising differential amplifier means for producing a flow-dependent signal dependent upon the voltage, the differential amplifier means including an output and a pair of inputs, each of the inputs being operatively connected to a respective one of the electrodes, and amplifier means for amplifying the flow-dependent signal, characterized in that the signal processing means include polarity-sensing means for sensing a change in the direction of flow through the body, and flip-flop means for reversing the connections between the electrodes and the inputs of the differential amplifier means in response to a change of the direction. Preferably, the flip-flop means comprise a plurality of semiconductor switches, the same number of electrically conductive switches being connected in each operative path between each electrode and its respective input of the differential amplifier. Separate calibration for flow in each direction is thereby rendered unnecessary.

BRIEF DESCRIPTION OF THE DRAWING

The FIGURE is a a schematic diagram of a preferred embodiment of bidirectional magnetic flowmeter of the present invention.

DESCRIPTION OF THE PREFERRED EMBODIMENT

Referring now to the FIGURE, reference numeral 1 indicates a magnetic flowmeter system incorporating the present invention. The flowmeter system 1 includes a flow tube 3, a pair of oppositely disposed electromagnetic coils 5 energized from a source 7, and a pair of electrodes 9a and 9b which sense a voltage generated by the flow of an electrically conductive fluid through the magnetic field produced by the coils 5 across the tube 3. The voltage at each electrode 9a and 9b is isolated by a voltage follower 11a and 11b respectively and fed, through a switching network 12 in accordance with the present invention, to a differential amplifier 13. The flow-dependent signal from the amplifier 13 is fed to a further amplifier 15, a sample and hold circuit 17 and an output circuit 19. The signal at the sample and hold circuit 17 is fed to a direction sensing circuit 21, which senses the polarity of the signal and in turn provides an input to a control circuit 23. The direction sensing circuit 21 preferably includes a threshold to prevent oscillation near zero flow condition. The control circuit 23 is connected to control the switching network 12.

The switching network 12 includes four matched solid-state switches 25a, 25b, 25c and 25d. Two of the switches 25a and 25b are controlled by a first output 27 of the control circuit 23, and the other two switches are controlled by the complementary output 29 of the control circuit 23.

When a signal is present at the first output 27 of the control circuit 23, switch 25a becomes electrically conductive and connects electrode 9a and voltage follower 11a through a matched resistor pair 31 to the inverting input of differential amplifier 13, and switch 25b becomes electrically conductive and connects electrode 9b and voltage follower 11b through a second matched resistor pair 33 to the non-inverting input of differential amplifier 13. The resistor pairs 31 and 33, a feed-back resistor 35 and a ground reference resistor 37 may all be parts of a high precision matched resistor package.

When a signal is present at the complementary output 29 of the control circuit 23, switch 25c becomes electrically conductive and connects electrode 9a and voltage follower 11a through the second matched resistor pair 33 to the non-inverting input of differential amplifier 13, and switch 25d becomes electrically conductive and connects electrode 9b and voltage follower 11b through the first matched resistor pair 31 to the inverting input of differential amplifier 13. It will be seen that the presence of a signal at the complementary output 29 of the control circuit 23 reverses the connections between the electrodes 11a and 11b and the inputs of the differential amplifier 13. It will also be seen, however, that the signal paths are symmetrical in both conditions of the control circuit 23, that is, and the signal paths are through identically matched components. Therefore, no gain error is introduced when the electrode leads are reversed, and no additional calibration is required to accommodate bidirectional flow.

The first output 27 of the control circuit 23 is also connected through an isolator 39, such as an optical isolator, to the output circuit 19, to give an indication of the direction of flow.

In the operation of the flowmeter system 1 of the invention, with the flow through tube 3 in a "forward" direction and with the control circuit 23 producing a signal at its first output 27, the flow-dependent signal from the differential amplifier 13 has a positive polarity. This signal is amplified by amplifier 15, sampled and held by sample-and-hold circuit 17 and fed to output 19 for display or control. The amplified flow-dependent signal at the sample-and-hold circuit 17 is sensed to be positive by the direction sensing circuit 21, which therefore permits the control circuit 23 to maintain the signal at its first output 27. The voltage at electrode 9a thus continues to be fed to the inverting input of differential amplifier 13 and the voltage at electrode 9b is fed to the non-inverting input of differential amplifier 13.

The presence of a signal at the first output 27 of control circuit 23 produces a signal through the isolator 39 to the output 19 indicative of forward flow. This signal is displayed or processed by the output circuit 19 in conjunction with the amplified flow-dependent signal.

When the flow through flow tube 3 reverses direction, the flow-dependent signal from differential amplifier 13 becomes negative. The amplified flow-dependent signal at the sample-and-hold circuit 17 thus also becomes negative, and the direction sensing circuit 21 causes the control circuit 23 to reverse its outputs, thereby removing the control signal from its first output 27 and simultaneously producing a control signal at its complementary output 29. The electrode 9a then is connected to the non-inverting input of amplifier 13, and the electrode 9b becomes connected to the inverting input of differential amplifier 13. Therefore, the flow-dependent signal from amplifier 13 again becomes positive.

When the signal is removed from the first output 27 of the control circuit 23, the lack of signal at the isolator 39 is taken by the output circuitry 19 as an indication of reverse flow and is displayed or processed as a negative flow.

Numerous variations in the bidirectional magnetic flowmeter system of the present invention, within the scope of the appended claims, will occur to those skilled in the art in light of the foregoing disclosure.

We claim:

1. In a magnetic flowmeter comprising a body adapted to be connected in a flow system for measuring the flow of a fluid therethrough, means for generating a magnetic field in said fluid flowing through said body, a pair of electrodes in said body for sensing a voltage generated in said fluid, and signal processing means for producing an output signal dependent on the magnitude and polartiy of said voltage, said signal processing means comprising differential amplifier means for producing a flow-dependent signal dependent upon said voltage, said differential amplifier means including an output and a pair of inputs, each of said inputs being operatively connected to a respective one of said electrodes, and amplifier means for amplifying said flow-dependent signal, the improvement wherein said signal processing means include polarity-sensing means for sensing a change in the direction of flow through said body, and flip-flop means for reversing the connections between said electrodes and said inputs of said differential amplifier means in response to a change of said direction.

2. The improvement of claim 1 wherein said flip-flop means comprise a plurality of semiconductor switches, the same number of electrically conductive switches being connected in each operative path between each said electrode and its respective input of said differential amplifier, whereby separate calibration for flow in each direction is rendered unnecessary.

3. The improvement of claim 2 wherein said flip-flop means comprise four semiconductor switches, exactly one electrically conductive switch of said switches being connected in each operative path between one of said electrodes and input of said differential amplifier in each direction of flow.

4. The improvement of claims 1, 2, or 3 wherein an output signal is provided indicative of the direction of flow.

5. The improvement of claims 1, 2, or 3 wherein said polarity-sensing means include threshold for preventing oscillation near zero flow condition.

* * * * *